United States Patent [19]

Kamitz et al.

[11] Patent Number: 4,614,924
[45] Date of Patent: Sep. 30, 1986

[54] APPARATUS FOR SCREENING APPLIANCES FROM HIGH FREQUENCY INTERFERENCE

[75] Inventors: Herbert Kamitz, Mödling; Franz Simon, Schwarzau, both of Austria

[73] Assignee: Josef Feller Gesellschaft m.b.H., Gunselsdorf, Austria

[21] Appl. No.: 468,926

[22] Filed: Feb. 23, 1983

[30] Foreign Application Priority Data

Feb. 25, 1982 [AT] Austria ................................. 717/82

[51] Int. Cl.$^4$ ......................... H03H 7/01; H03H 7/09
[52] U.S. Cl. ...................................... 333/167; 333/12;
333/177; 333/181; 333/185
[58] Field of Search .............................. 333/167–185,
333/12; 307/30, 105, 89–91; 174/35 R, 35 C, 35 MS, 36

[56] References Cited

U.S. PATENT DOCUMENTS

| | | | |
|---|---|---|---|
| 1,949,996 | 3/1934 | Fleming | 307/105 X |
| 2,186,578 | 1/1940 | Doughman | 307/105 X |
| 2,939,095 | 5/1960 | Chertok | 333/167 |
| 3,374,447 | 3/1968 | Stilwell | 333/167 |

FOREIGN PATENT DOCUMENTS

| | | |
|---|---|---|
| 592347 | 1/1934 | Fed. Rep. of Germany . |
| 2633673 | 2/1978 | Fed. Rep. of Germany . |
| 4447033 | 2/1935 | United Kingdom . |
| 507108 | 6/1939 | United Kingdom . |
| 672239 | 5/1952 | United Kingdom . |
| 1353890 | 5/1974 | United Kingdom . |
| 1512626 | 6/1978 | United Kingdom . |
| 2020494 | 11/1979 | United Kingdom . |

OTHER PUBLICATIONS

Curran—"Power Line Filter", IBM Technical Disclosure Bulletin, vol. 7, No. 7, Dec. 1964; p. 569.

*Primary Examiner*—Marvin L. Nussbaum
*Attorney, Agent, or Firm*—Kuhn Muller and Bazerman

[57] ABSTRACT

An apparatus for screening appliances from high frequency interference from the mains supply electrically connected to the appliance has an interference filter being incorporated in the mains plug and comprising at least an induction coil and a capacitor. The capacitors normally used to screen from asymmetric oscillations between the neutral conductor and phase conductor on the one hand and the protective conductor on the other are replaced by a screen of sheeting for the conductor leading from the plug to the appliance. The screen of sheeting is joined to the protective conductor.

2 Claims, 3 Drawing Figures

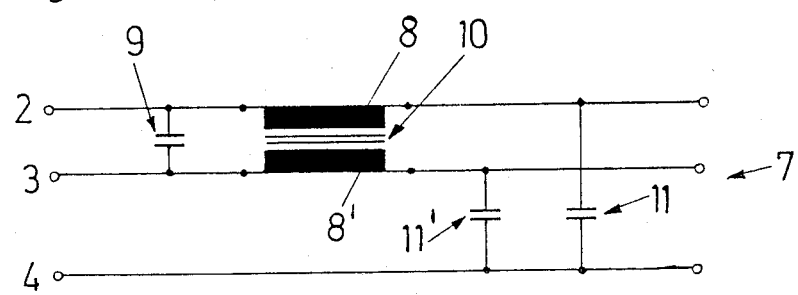
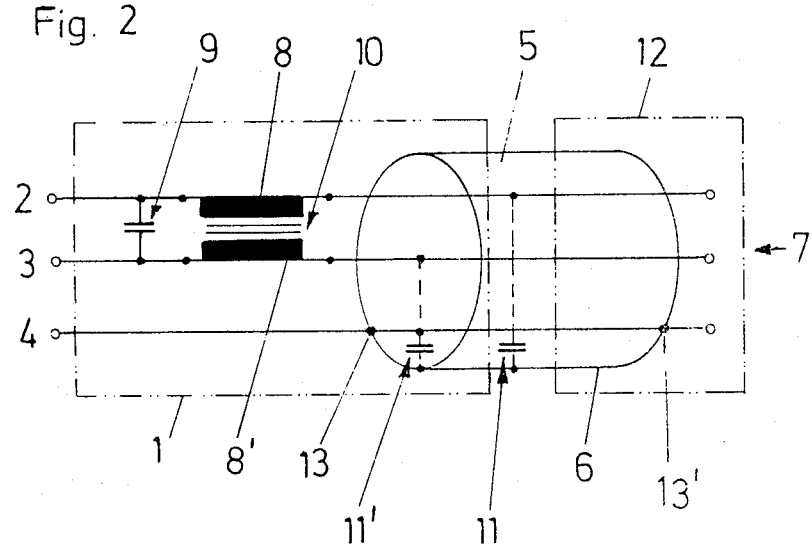

APPARATUS FOR SCREENING APPLIANCES FROM HIGH FREQUENCY INTERFERENCE

BACKGROUND AND FIELD OF THE INVENTION

The invention relates to an apparatus for screening appliances from high frequency interference from the mains supply electrically connected to the appliance, wherein an interference filter, comprising at least an induction coil and a capacitor, is incorporated in a plug.

DESCRIPTION OF THE PRIOR ART

The purpose of such interference filters is to protect the downstream appliance, e.g. a piece of data processing equipment, from having its operation impaired by high frequency interference from the mains. In the simplest case, interference symmetrical with the phase and neutral conductor is reduced to a harmless dimension by an induction coil in the phase conductor, one in the neutral conductor and a capacitor interpolated between the two conductors. Separate capacitors are necessary to reduce asymmetric interference pulses appearing between the phase and neutral conductor on the one hand and the protective conductor on the other.

Known interference filters are all arranged on the appliance; in appliances which are permanently connected the filter is located inside the casing, and in plug-in equipment it is at all events in the casing too (see Austrian Patent Specification No. 319.370).

Known interference filters increase the space requirement of the appliance protected and also constitute a heat source, which is all the more a disadvantage in that modern appliances are generally encapsulated and difficult to ventilate. In addition a mass produced piece of equipment will only be fitted with interference filters catering for normal interference, although this poses the problem of providing additional protection when special interference is encountered.

The invention avoids the above disadvantages primarily by transposing the interference filter from the appliance or the plug thereof to the mains plug. At first sight this appears to be a disadvantage, since it does not eliminate interference entering through the mains conductor. In the last resort, however, the apparent disadvantage, that with the interference filter located in the mains plug the mains conductor has to be provided with a screen of sheeting, proves to be an advantage, in that it makes it possible to dispense with the capacitors which were formerly required to reduce asymmetric interference pulses. Thus the invention provides that the interference filter is incorporated in the mains plug, and that the capacitors normally used to screen from asymmetric oscillations between the neutral conductor and phase conductor on the one hand and the protective conductor on the other, are replaced by a screen of sheeting for the conductor leading from the plug to the appliance, the screen of sheeting being joined to the protective conductor.

The arrangement of a filter circuit in a mains plug has hitherto been known only in conjunction with a transformer plug (see laid open German Specification No. 26 33 673), where the problem underlying the invention does not arise since the appliance is electrically separated from the mains.

SUMMARY OF THE INVENTION

As compared with known apparatus of the same type the interference filter according to the invention, while operating completely efficiently, is distinctive in having the minimum number of components, since in the ideal case the interference filter consists exclusively of an induction coil in the neutral conductor, one in the phase conductor and a capacitor arranged between those conductors.

BRIEF DESCRIPTION OF THE DRAWING

Further details of the invention will be explained with reference to the accompanying drawings, in which:

FIG. 1 is a circuit diagram showing the simplest conventional interference filter, FIG. 2 is a diagram showing the construction of an apparatus according to the invention and FIG. 3 is a longitudinal section through a corresponding mains plug.

DESCRIPTION OF THE PREFERRED EMBODIMENT

Figure 3:
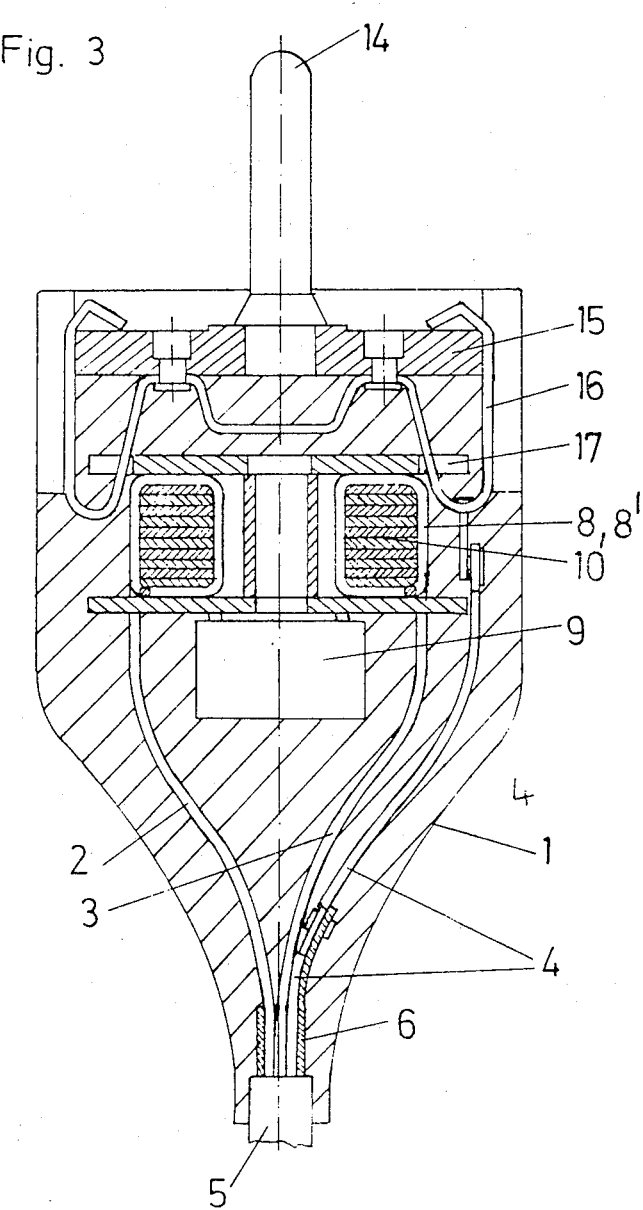

Referring to FIG. 1, a conventional interference filter comprises an induction coil each 8 and 8' in phase conductor 2 and neutral conductor 3, the two coils being wound onto a common iron core 10. Interference pulses symmetrical with 2 and 3 are filtered out through the two induction coils 8, 8' and the capacitor 9, which is interpolated between the two conductors. Further capacitors 11 and 11' are used to absorb asymmetrical interference which occurs relative to the protective conductor 4. The whole arrangement is normally contained in the appliance 7 as shown in FIG. 1.

It is also known to provide the arrangement as an integral part of the appliance plug.

In the arrangement according to the invention, shown in FIG. 2, the induction coils 8, 8', the iron core 10 and the capacitor 9 are provided as an integral part of the mains plug 1. The mains wire 5, leading from the mains plug 1 to the appliance 7, is joined to a screen 6 of sheeting in the usual way. The screen 6 is earthed at the point 13 and 13' on the protective conductor 4. This capacitance relative to the neutral conductor 2 and phase conductor 3 can readily be chosen so as to make the capacitors 11 and 11' superfluous, by suitably dimensioning the length of the mains conductor 5 and the distance between the screen 6 and the conductors 2 and 3. The screen 6 of sheeting prevents both absorption of interference pulses by the mains conductor 5 and also radiation of interference pulses which are caused by the appliance 7 itself.

FIG. 3 shows an example of the construction of a mains plug with an interference filter incorporated in it, the external dimensions of the filter complying with the standards, in the case illustrated CEE(7)IV. In the conventional manner the mains plug 1 comprises a plug bridge with plug pins 14, a supporting member 15 and earthing yokes 16. The components of the interference filter are fixed to a support 17 and, as mentioned, substantially consist of an iron core with the two induction coils 8 and 8' wound around it, and a capacitor 9 for absorbing symmetrical interference. When the mains wire 5 has been connected, these components are coated with soft PVC in accordance with the prescribed contours. Before the stranded mains wire 5 is sheathed, it in turn has an aluminium screen 6 wound around it with a spiral overlap. Here again the dielectric is PVC.

In the event of a mains conductor being installed for a rated voltage of 250 V and a rated current of 6 A, a conductor of type FSchH05VV-F3G0, 75 will, for example, be used, a capacitor with 4,700 pF and coils each with L=0.8 mH.

It will be appreciated that equipment which has not been provided with an interference filter from the start, or where the filter cannot cater for special mains conditions, can easily be fitted with the apparatus illustrated at a later date, simply by replacing the existing mains plug and the existing mains conductor with the mains plug 1 and the screened mains conductor integrated therewith.

What is claimed is:

1. Apparatus for screening an electrical appliance from electrical supply borne high frequency interference, the apparatus comprising:

a plug connector for insertion in an outlet connected to the main electric supply attached to one end of an electric cord, the other end thereof being connectable to the appliance;

an interference filter that comprises at least one induction coil and a capacitor and that is incorporated in the plug; and capacitance means for suppressing asymmetrical interference between a neutral conductor and a phase conductor of the electric cord on the one hand, and a protective ground conductor thereof on the other hand, the capacitance means comprising a screen of sheathing for the conductors of said electric cord, the screen being connected to the protective ground conductor.

2. An apparatus as claimed in claim 1, wherein said interference filter comprises an induction coil in said neutral conductor and in said phase conductor, and a capacitor connected between said neutral and phase conductors.

* * * * *